US009271886B2

(12) United States Patent
Stephens

(10) Patent No.: US 9,271,886 B2
(45) Date of Patent: Mar. 1, 2016

(54) REACTIVE HEADREST SYSTEM FOR DISABLED INDIVIDUALS

(71) Applicant: WiSys Technology Foundation, Inc., Madison, WI (US)

(72) Inventor: Charles Joseph Stephens, Madison, WI (US)

(73) Assignee: WISYS TECHNOLOGY FOUNDATION, INC., Madison, WI (US)

( * ) Notice: Subject to any disclaimer, the term of this patent is extended or adjusted under 35 U.S.C. 154(b) by 168 days.

(21) Appl. No.: 13/713,499

(22) Filed: Dec. 13, 2012

(65) Prior Publication Data

US 2013/0257014 A1 Oct. 3, 2013

Related U.S. Application Data

(60) Provisional application No. 61/578,580, filed on Dec. 21, 2011.

(51) Int. Cl.
*B62J 9/00* (2006.01)
*A61G 5/12* (2006.01)

(52) U.S. Cl.
CPC ............ *A61G 5/12* (2013.01); *A61G 2005/121* (2013.01)

(58) Field of Classification Search
CPC .......................................................... A47C 1/10
USPC .......... 297/216.12, 404, 407, 408; 180/304.1, 180/304.3; 280/304.1, 304.3
See application file for complete search history.

(56) References Cited

U.S. PATENT DOCUMENTS

| | | | | | |
|---|---|---|---|---|---|
| 1,471,168 | A | * | 10/1923 | Katz | 297/404 |
| 2,180,768 | A | * | 11/1939 | Peterson | 297/405 |
| 2,490,088 | A | * | 12/1949 | Penn | 297/401 |
| 2,642,124 | A | * | 6/1953 | Slowey | 297/398 |
| 2,666,476 | A | * | 1/1954 | Lycan | 297/404 |
| 2,828,810 | A | * | 4/1958 | Barecki et al. | 297/396 |
| 2,869,619 | A | * | 1/1959 | Petersen et al. | 297/61 |
| 2,869,622 | A | * | 1/1959 | Petersen et al. | 297/396 |
| 2,973,029 | A | * | 2/1961 | Schlosstein | 297/216.12 |
| 3,018,133 | A | * | 1/1962 | Mills | 297/397 |
| 3,151,911 | A | * | 10/1964 | Eichorst | 297/397 |
| 3,328,083 | A | * | 6/1967 | Bourne | 297/404 |
| 4,370,898 | A | * | 2/1983 | Maruyama | 74/540 |
| 4,637,655 | A | * | 1/1987 | Fourrey et al. | 297/410 |
| 4,673,214 | A | * | 6/1987 | Meiller | 297/408 |
| 4,674,797 | A | * | 6/1987 | Tateyama | 297/408 |
| 4,830,567 | A | * | 5/1989 | Rachman | 414/678 |
| 4,856,848 | A | * | 8/1989 | O'Sullivan et al. | 297/391 |
| 5,054,856 | A | * | 10/1991 | Wang | 297/408 |

(Continued)

OTHER PUBLICATIONS

Admitted Prior Art—Website; www.millersadaptive.com; Head Support Belled Headrest—Dynamic Interface; Catalog; p. 4; Miller's Adaptive Technologies.

(Continued)

*Primary Examiner* — Joseph Rocca
*Assistant Examiner* — Conan Duda
(74) *Attorney, Agent, or Firm* — Boyle Fredrickson, S.C.

(57) ABSTRACT

A headrest assembly for assisting individuals with hypertonic extension pattern provides a pivoting support that better matches the pivoting motion of the patient's head in backward extension. A restoring spring absorbs and dissipates the energy of the extension and provides adjustable spring restoring force.

16 Claims, 5 Drawing Sheets

(56) References Cited

U.S. PATENT DOCUMENTS

| | | | | | |
|---|---|---|---|---|---|
| 5,181,763 | A * | 1/1993 | Dellanno et al. | 297/391 |
| 5,238,295 | A * | 8/1993 | Harrell | 297/408 |
| 5,290,091 | A * | 3/1994 | Dellanno et al. | 297/391 |
| 5,308,028 | A * | 5/1994 | Kornberg | 248/118 |
| 5,791,735 | A * | 8/1998 | Helman | 297/407 |
| 6,299,254 | B1 * | 10/2001 | Dinh et al. | 297/408 |
| 6,942,292 | B2 * | 9/2005 | Low et al. | 297/216.12 |
| 6,957,858 | B2 * | 10/2005 | Yetukuri et al. | 297/216.12 |
| 7,052,023 | B2 * | 5/2006 | Chen et al. | 280/47.38 |
| 7,303,232 | B1 * | 12/2007 | Chen | 297/284.8 |
| 7,431,399 | B2 * | 10/2008 | Kern et al. | 297/403 |
| 8,382,206 | B2 * | 2/2013 | Grable | 297/408 |
| 2002/0067019 | A1 * | 6/2002 | Brown | 280/250.1 |
| 2011/0089738 | A1 * | 4/2011 | Jen et al. | 297/404 |
| 2012/0062010 | A1 * | 3/2012 | Holmes et al. | 297/354.1 |

OTHER PUBLICATIONS

Admitted Prior Art—Whitmyer Biomechanix, 2006 Product Catalog; p. 20; Tallahassee, FL; US.

Admitted Prior Art—Freedom Designs, Inc; Seating & Positioning Catalog; p. 81; Simi Valley, CA.

* cited by examiner

REACTIVE HEADREST SYSTEM FOR DISABLED INDIVIDUALS

CROSS-REFERENCE TO RELATED APPLICATIONS

This application claims the benefit of U.S. provisional application 61/578,580 filed Dec. 21, 2011 and hereby Incorporated by reference.

BACKGROUND OF THE INVENTION

The present invention relates to a headrest for use on wheelchairs and the like to support the heads of individuals with hypertonic extension patterns and, in particular, to a headrest providing improved position relief during extension episodes.

Hypertonia is an abnormal increase in muscle tension that can be expressed in uncontrollable muscle spasms and that may be associated with disabilities such as cerebral palsy or the like. Hypertonicity of the neck muscles can result in neck hyper-extension and injury to an individual if their head is not properly supported during the extension episodes.

A standard headrest, for example, incorporated into a wheelchair or other similar device, can be inadequate for dissipating the force of hypertonic extension because of its relatively unyielding nature. For this reason it is known to mount headrests on the shaft of a gas spring whose body is affixed to the wheelchair. The gas spring allows position relief permitting the head to move backward in the direction of the dominant muscles while absorbing and dissipating the energy of the extension.

SUMMARY OF THE INVENTION

The present inventor has recognized that the motion of common position relief headrests can promote an undesired elevation of the patient's head and, further, that hypertonic extension often applies significant off-axis forces which can jam conventional position relief headrests. In this regard, the present invention provides a position relief headrest mount that employs a pivoting action that better follows the natural trajectory of head movement during a hypertonic extension pattern episode. Further, the pivoting action allows forces on the headrests to be shared among displaced pivot points for improved robustness and resistance to jamming from off-axis forces.

Specifically then, the present invention provides a headrest assembly having a base bracket adapted to attach to a backrest to support a pivot element proximate to a back of a seated patient's neck, the pivot element defining a substantially horizontal pivot axis substantially parallel to a support face of a seat back. A headrest support is attached to the pivot element at a proximal end to pivot about the horizontal axis of the pivot element and extends upward therefrom to a distal end, the headrest support providing a mounting surface between the distal end and proximal ends for receiving a headrest cushion, the mounting surface facing a back of the seated patient's head. A spring assembly is attached between the base bracket and the headrest support biasing the headrest support to a neutral upright position when the headrest support is pivoted backward away from the seated patient.

It is thus an object of at least one embodiment of the invention to provide a headrest support which better supports a patient's neck during hypertonic extension pattern movement reducing lifting force on the patient's neck.

The spring assembly may include a stop element limiting forward travel of the headrest support beyond the neutral upright position.

It is thus an object of at least one embodiment of the invention to allow accommodating motion of the headrest and then to return the headrest to a supportive position after the hypertonic episode where it can provide normal head support.

The headrest assembly may include a lock locking the headrest support in the neutral upright position.

It is thus an object of at least one embodiment of the invention to permit use of the headrest in situations where movement would not be desired, for example with travel.

The spring assembly may include an interfitting rod and guide, one pivotally attached to the base bracket and one pivotally attached to the distal end of the headrest support so that the rod may slide through the guide with pivoting movement of the headrest support.

It is thus an object of at least one embodiment of the invention to provide a simple mechanism for control of motion of the distal end of the headrest support. The dual pivots allow a spanning rod to connect the base bracket and distal end of the headrest support for positive mechanical control.

The spring assembly may include a helical compression spring surrounding the rod and extending between one face of the guide and a locking collar fixed to the rod.

It is thus an object of at least one embodiment of the invention to provide a simple mechanism for applying a spring bias to the distal end of the headrest support. The helical compression spring is stabilized by the center positioned rod.

The headrest assembly may further include a second locking collar fixed to the rod on an opposite side of the guide from the locking collar.

It is thus an object of at least one embodiment of the invention to provide a positive yet adjustable forward stop for the headrest support.

At least one of the locking collars may provide a lock element that may be released to allow repositioning of the locking collar along the rod.

It is thus an object of at least one embodiment of the invention to permit adjustment of the spring rate of the restoring force (force per deflection angle) and/or the angle of the neutral upright position.

The guide may include a lock element gripping the interfitting rod to hold the headrest support in the neutral upright position.

It is thus an object of at least one embodiment of the invention to provide a method of locking the headrest support for travel and the like that may integrate with the spring assembly.

The base bracket may include a slide element positionable to extend substantially horizontally at a top of the seat back and perpendicular to the support face of the seat back and a locking guide attachable to the seat back allowing sliding of the slide element therethrough to adjust the horizontal location of the pivot element.

It is thus an object of at least one embodiment of the invention to permit adjustment of the pivot point of the headrest support appropriately for a given patient to match the patient head movement.

The headrest assembly may include a headrest cushion attached to the mounting surface of the headrest support providing a compliant surface for receiving the seated patient's head thereagainst.

It is thus an object of at least one embodiment of the invention to permit the invention to be used with a variety of different headrest cushions.

These particular objects and advantages may apply to only some embodiments falling within the claims and thus do not define the scope of the invention.

BRIEF DESCRIPTION OF THE FIGURES

FIG. 9 is a cross-sectional view of the guide block of FIG. 5 in a front elevational plane showing a locking mechanism for locking the headrest assembly for travel and the like.

DETAILED DESCRIPTION OF THE PREFERRED EMBODIMENT

Figure 1:
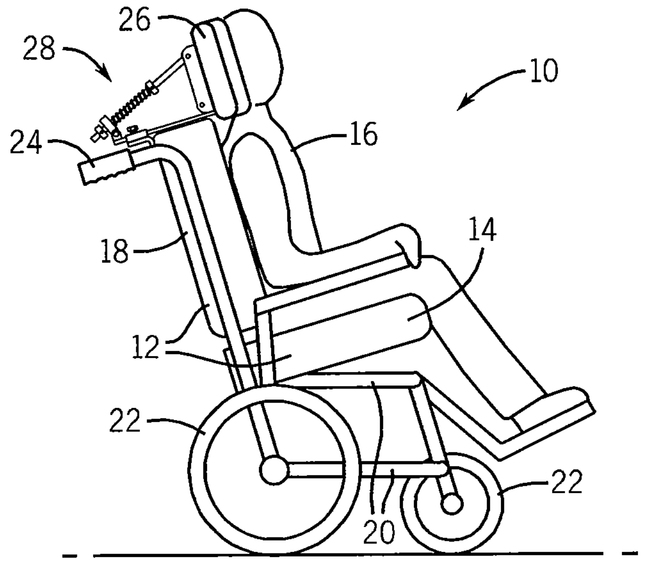
FIG. 1 is a side elevational view of a wheelchair suitable for use with the headrest assembly of the present invention showing a seated individual.

Referring now to FIG. 1, a wheelchair 10 may provide a seat assembly 12 having a substantially horizontal seat pan 14 on which a patient 16 may sit. A seatback 18 may extend upward from a rear of the seat pan 14 to support the back of the seated patient 16 thereagainst.

The seat pan 14 and seatback 18 of the seat assembly 12 may be joined by means of a seat frame 20 to wheels 22 positioned beneath the seat assembly 12 so that the seat assembly 12 maybe moved by rolling the wheels 22 over a surface, for example, as pushed by an assistant gripping hand grips 24 extending rearward from the upper edge of the seatback 18. The patient's head may be supported at its back by a headrest cushion 26 attached to a headrest assembly 28 of the present invention.

Figure 2:
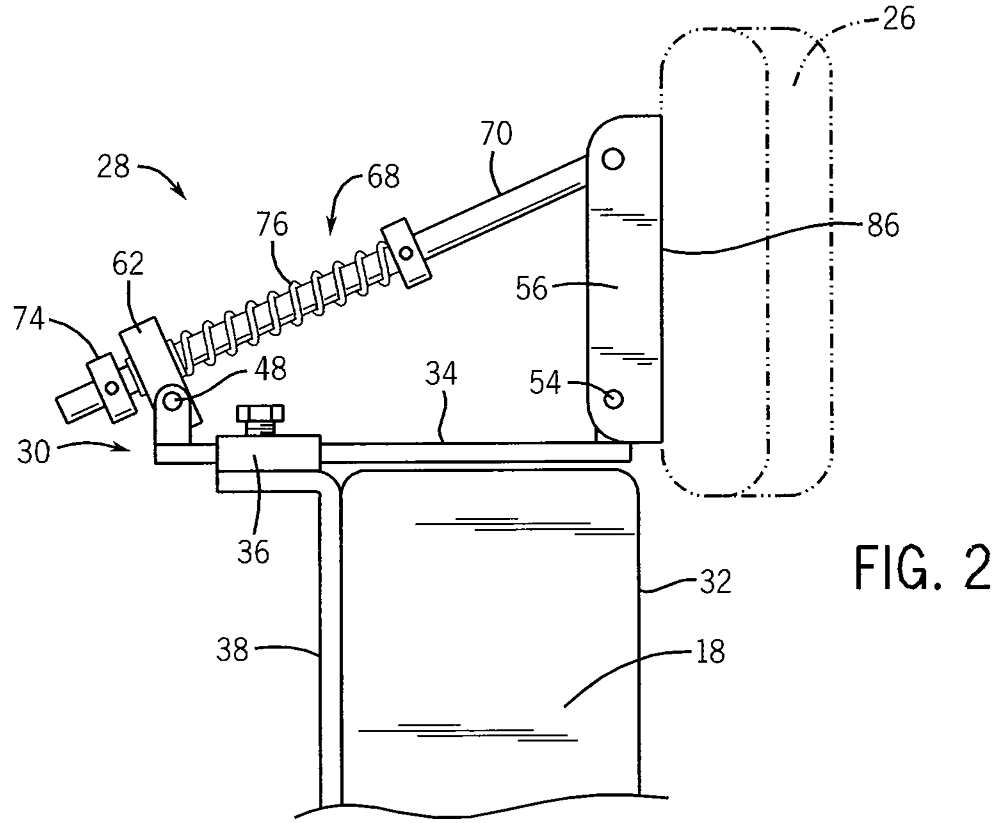
FIG. 2 is a detailed fragmentary view of the headrest assembly of FIG. 1 showing a headrest cushion in phantom.

Referring now to FIG. 2, the headrest assembly 28 may provide a base bracket 30 extending generally horizontally along the top of the seatback 18 in a direction generally perpendicular to a support face 32 of the seatback 18 against which the patient rests when in the seated position on the seat assembly 12. The base bracket 30 may include a slide bar 34, for example, being an eighth inch thick steel plate between eight and twelve inches long and 1½ inches wide. The slide bar 34 may be held by a clamp 36 attached to a downwardly extending support arm 38, the latter which may be attached to the seat frame 20 or the seatback 18 by conventional means. The slide bar 34 may move forward and backward along its length through the clamp 36 and may be fixed in position by a lock bolt 40 threadably received in the clamp 36 so that the clamp 36 may be tightened to press the slide bar 34 against an opposed clamp surface immobilizing it.

A rear end of the slide bar 34, removed from the patient 16, may support on its upper surface an attached pivot bracket 42 having left and right upstanding tabs 44 with aligned holes defining a pivot axis 46 to receive a pivot pin 48 therethrough. The pivot axis 46 is generally horizontal and parallel to the support face 32 shown in FIG. 2. A corresponding pivot bracket 50 is attached to the front end of the slide bar 34 toward the patient 16 and also has upwardly extending left and right tabs 43 with holes aligned along a pivot axis 52 to receive pivot pin 54 therethrough. Pivot axis 52 is generally parallel to pivot axis 46.

A headrest support channel 56 may provide rearward the extending channel flanges 58 supporting aligned holes in opposite flanges at a proximal end 60 and distal end 63 of the headrest support channel 56. The holes in the distal end 63 may align with the holes in the pivot bracket 50 and be attached to the pivot bracket 50 by the pivot pin 54 passing along axis 52 through each of the holes of the headrest support channel 56 and pivot bracket 50. The pivot pin 54 allows the headrest support channel 56 to pivot about axis 52 as attached to the base bracket 30.

Figure 3:
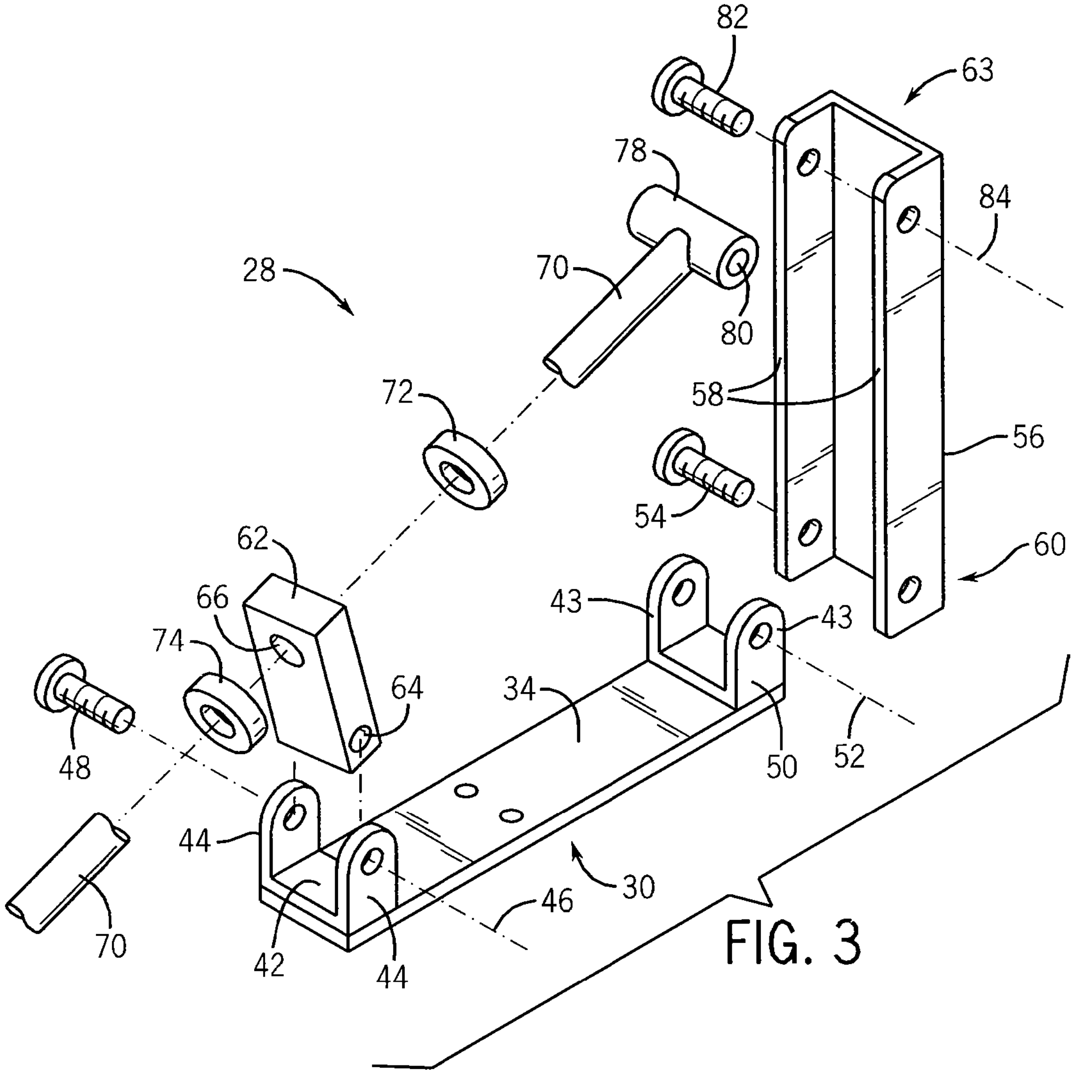
FIG. 3 is an exploded perspective view of the principal mechanical components of the headrest assembly.

Referring still to FIGS. 2 and 3, a guide block 62 may have a hole 64 in its lower end that may align with the holes in the tabs 44 of the pivot bracket 42 to be retained to the pivot bracket 42 through the introduction of the pivot pin 48 through the holes in the pivot bracket 42 and hole 64 in the guide block 62. In this way, the guide block 62 may pivot about pivot axis 46. An upper end of the guide block 62 provides a guide hole 66 generally perpendicular to the axis 46 of the pin 48.

The guide block 62 and headrest support channel 56 are joined by a spring assembly 68 including generally a cylindrical rod 70, locking collars 72 and 74 fitting coaxially around the cylindrical rod 70, and a helical spring 76 fitting coaxially around the rod 70. The locking collars 72 and 74 have radial set screws for locking the locking collars 72 and 74 to the cylindrical rod 70 or releasing them therefrom to slide along the length of the cylindrical rod 70.

Referring to FIG. 3, a tubular bushing 78 having a central bore 80 may fit between the holes of the distal end of the headrest support channel 56 to be pivotally retained there by pivot pin 82 so that the tubular bushing 78 may pivot about an axis 84 generally parallel to axes 52 and 46. A midpoint of the tubular bushing 78 may be welded to one end of the cylindrical rod 70 to extend perpendicularly therefrom.

The cylindrical rod 70, extending from the tubular bushing 78 may pass through locking collar 72 and then through helical spring 76 to be received through the guide hole 66 in the guide block 62. The spring 76 is thus captured between opposed faces of the locking collar 72 and the guide block 62.

The cylindrical rod 70 further extends through the guide block 62 to be received by locking collar 74. Generally the size of the guide hole 66 is sized larger than the outer diameter of the cylindrical rod 70 so that the cylindrical rod 70 may pass freely therethrough without binding. The guide block 62, to this end, may be manufactured of a slippery plastic such as Delrin® or the like to reduce the possibility of binding.

A front face 86 of the headrest support channel 56 may provide mounting holes or the like for attachment to the headrest cushion 26. The headrest cushion 26 may be, for example, a cushion material such as an expanded polyurethane foam covered appropriately with fabric and attached to a support plate as is generally understood in the art.

Figure 4:
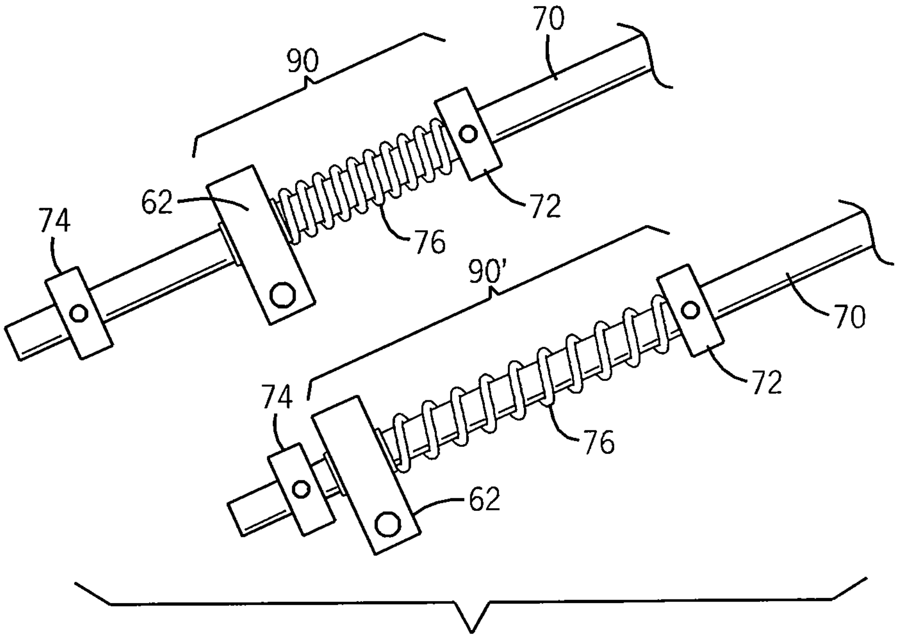
FIG. 4 is a fragmentary detail of a rod and collar mechanism for controlling spring bias and travel with two different adjustment settings.
Figure 5:
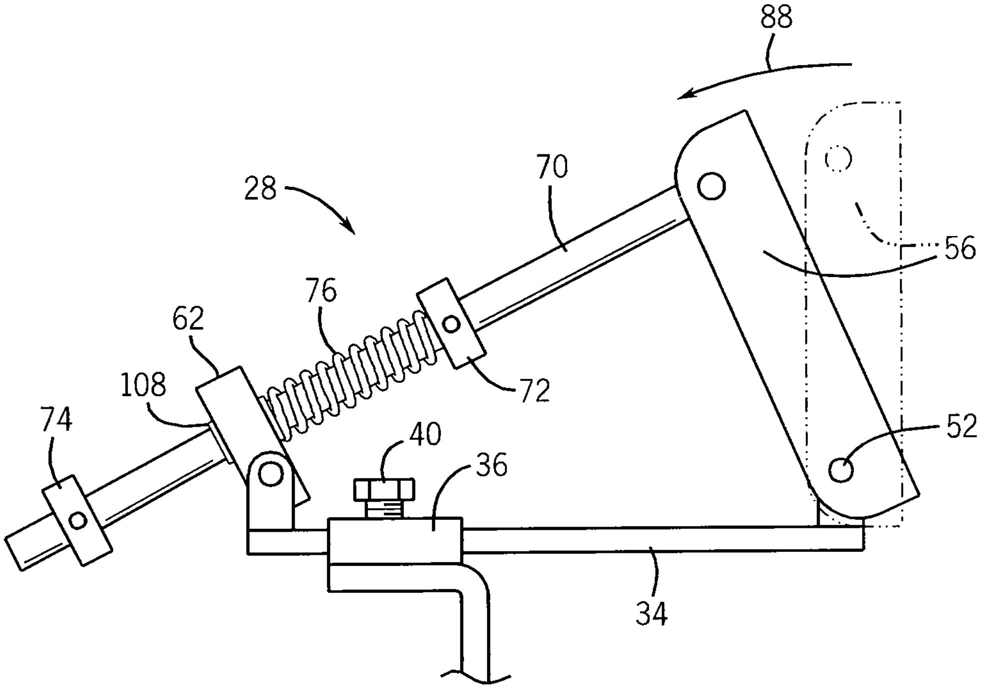
FIG. 5 is a figure similar to that of FIG. 2 showing pivoting of the headrest support of the headrest assembly away from an upright neutral position and showing an alternative guide block design.

Referring now to FIGS. 4 and 5, it will be appreciated that backward pressure, indicated by arrow 88, on the headrest support channel 56, for example, by a patient's head will cause a pivoting of the headrest support channel 56 backward pushing the cylindrical rod 70 through the guide block 62. This action will cause locking collar 72 to approach the guide block 62 compressing the helical spring 76 causing a countervailing restraining force on further pivoting of the headrest support channel 56. This compression absorbs the energy of hypertonic extension.

Referring to FIG. 4, the amount of countervailing force and the limits of travel may be adjusted by moving the locking collar 72 toward or away from the guide block 62. Shortening the separation distance 90 between the locking collar 72 and the guide block 62 will increase the spring rate of restoring force, while increasing the separation distance 90' will decrease the spring rate of restoring force. Generally, a neutral upright position with the headrest support channel 56 substantially vertical will be adopted when there is no force on the headrest support channel 56; however, the angle of this neutral upright position may be adjusted by adjusting the locking collar 74 with movement of the locking collar 74 toward the headrest support channel 56 changing the neutral position to slope backward. The locking collar 74 thus provides a stop against forward motion of the headrest support channel 56 during normal operation.

Figure 6:
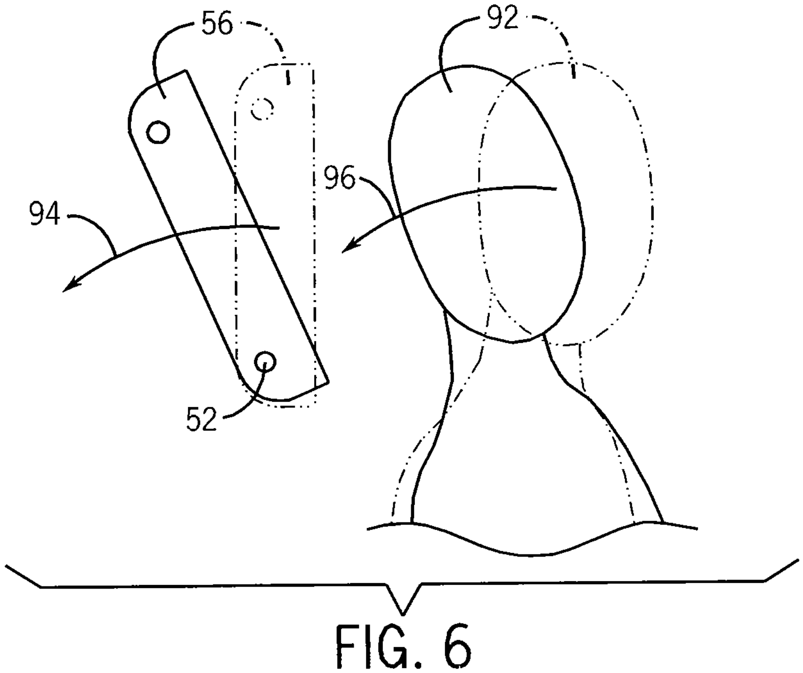
FIG. 6 is a simplified diagram of the headrest support and a person's head pivoting during hypertonic extension, the pivoting of the headrest support reducing extension of the neck during hypertonic extension.

Referring now to FIGS. 1 and 6, the pivoting motion 94 of the headrest support channel 56 about axis 52 better matches the pivoting motion 96 of the patient's head 92 during hypertonic extension, preventing an upward force on the patient's head 92 such as might overextend the patient's neck causing injury. This compatibility may be maximized by positioning the axis 52 close to the base of the head 92 near an effective pivot point of the head 92. This adjustment may be made by sliding the slide bar 34 through the clamp 36 to position the axis 52 appropriately near the patient's head.

Figure 7:
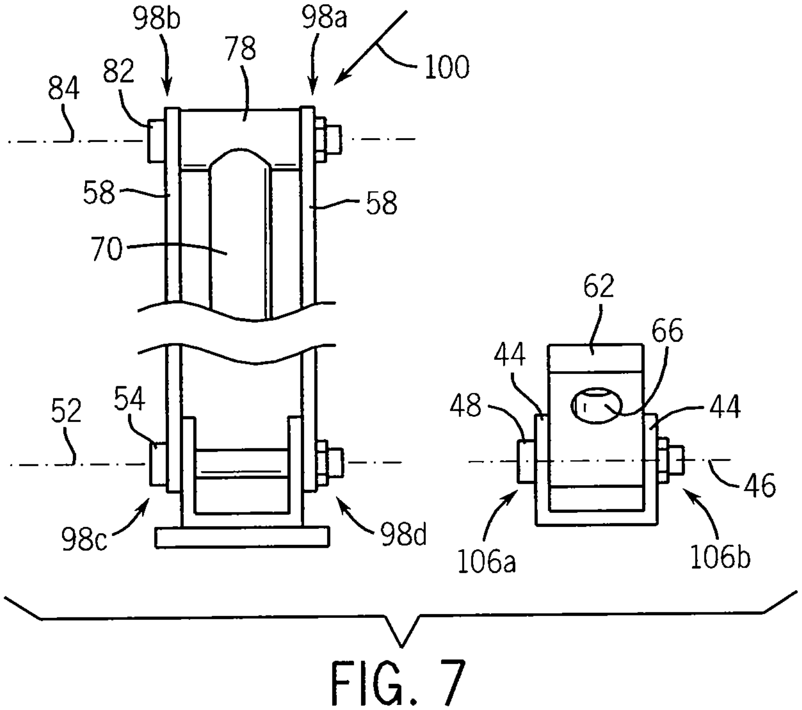
FIG. 7 is a side elevational view in fragment of the headrest assembly of FIG. 2 showing displacement of the pivot points of the headrest support for improved resistance to off-axis forces.
Figure 8:
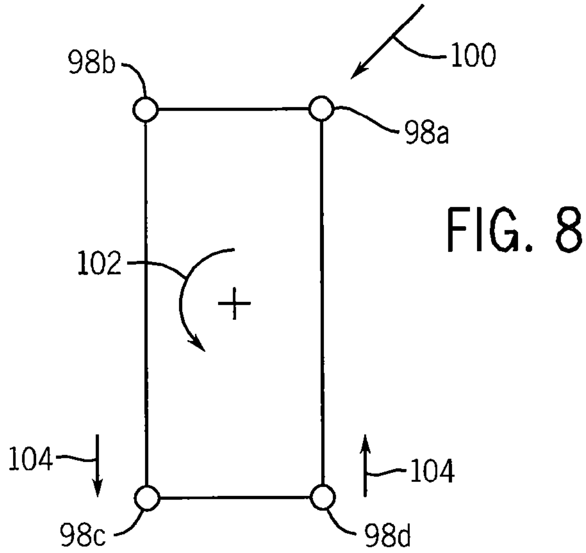
FIG. 8 is a simplified diagram of the pivot points of FIG. 7 showing the conversion of off-axis force into torque displaced to the separated pivot points of FIG. 7.

Referring now to FIGS. 7 and 8, the flanges 58 of the headrest support channel 56 may be separated by approximately 2 inches to provide displaced pivot points 98*a*-98*d* along axes 84 and 52. As a result, an off axis force 100, such as may occur if the force of the patient's head 92 is not perfectly aligned along an axis perpendicular to the support face 32, and which provides a torque 102, is generally dissipated across a longer lever arm to be resolved into relatively low upward and downward forces 104 at the pivot points 98*c* and 98*d*. This force-reducing leverage reduces the potential for jamming from off axis force 100. In addition, because the forces of torque are distributed over multiple pivot points 98, a more robust mechanism may be created. Similarly, any portions of off axis force that are transmitted to the guide block 62 are distributed over displaced pivot points 106*a* and 106*b* at the tabs 44.

Figure 9:
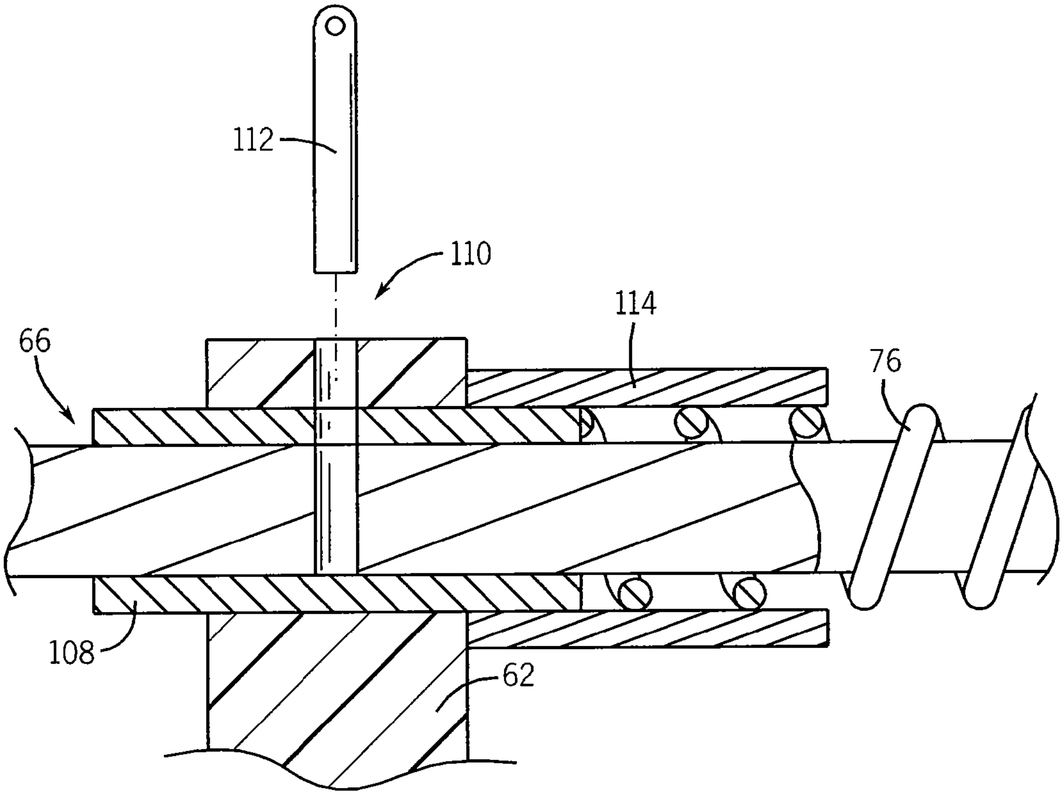

Referring now to FIGS. 5 and 9, in one embodiment, the guide block 62 may provide an inner tubular sleeve 108 defining the guide hole 66 and fitting within a larger hole through the material of the guide block 62. This tubular sleeve 108 may provide a radially hole 110 in its outer wall receiving a shaft of a locking pin 112 which, when inserted through the hole 110 and its continuation through the cylindrical rod 70, prevents movement of the cylindrical rod 70 through the tubular sleeve 108. In this way, the headrest assembly 28 may be locked, for example, for situations where a firm headrest position is required, for example, during travel. A secondary tube 114 may fit coaxially over an end of the tube 108 that projects out of the guide block 62 toward the spring 76. This secondary tube 114 provides a protective sheath covering an end of the spring 76 as it abuts the end of tube 108 to cover pinch points, between the spring coils and between the spring end and tube 108 with compression of the spring 76, for an operator working with the guide block 62, for example, during the insertion or removal of the pin 112.

Certain terminology is used herein for purposes of reference only, and thus is not intended to be limiting. For example, terms such as "upper", "lower", "above", and "below" refer to directions in the drawings to which reference is made. Terms such as "front", "back", "rear", "bottom" and "side", describe the orientation of portions of the component within a consistent but arbitrary frame of reference which is made clear by reference to the text and the associated drawings describing the component under discussion. Such terminology may include the words specifically mentioned above, derivatives thereof, and words of similar import. Similarly, the terms "first", "second" and other such numerical terms referring to structures do not imply a sequence or order unless clearly indicated by the context.

When introducing elements or features of the present disclosure and the exemplary embodiments, the articles "a", "an", "the" and "said" are intended to mean that there are one or more of such elements or features. The terms "comprising", "including" and "having" are intended to be inclusive and mean that there may be additional elements or features other than those specifically noted. It is further to be understood that the method steps, processes, and operations described herein are not to be construed as necessarily requiring their performance in the particular order discussed or illustrated, unless specifically identified as an order of performance. It is also to be understood that additional or alternative steps may be employed.

It is specifically intended that the present invention not be limited to the embodiments and illustrations contained herein and the claims should be understood to include modified forms of those embodiments including portions of the embodiments and combinations of elements of different embodiments as come within the scope of the following claims. All of the publications described herein, including patents and non-patent publications, are hereby incorporated herein by reference in their entireties.

I claim:

1. A headrest assembly for a seat having an upstanding seat back with a support face adapted to support a back of a seated patient seated in the seat comprising:

a base bracket having a pivot element, the base bracket adapted to attach to the seat to support the pivot element of the base bracket proximate to a back of the seated patient's neck, the pivot element defining a horizontal pivot axis parallel to the support face of the upstanding seat back;

a headrest support with a front face facing a forward direction and adapted to support the seated patient's head wherein the horizontal pivot axis is below the majority of the headrest support to pivot the headrest support with respect to the base bracket, the headrest support further including a headrest cushion attached to the front face; and a spring assembly attached between the base bracket and the headrest support to bias a topmost end of the front face in the forward direction;

wherein the spring assembly includes an interfitting rod and guide, one pivotally attached to the base bracket and one pivotally attached to a distal end of the headrest support opposite the pivot element so that the rod may slide through the guide with pivoting movement of the headrest support.

2. The headrest assembly of claim 1 wherein the spring assembly includes a stop element limiting forward travel of the headrest support beyond a neutral position with the front face substantially parallel to the support face of the upstanding seat back.

3. The headrest assembly of claim 1 further including a lock locking the headrest support in a neutral position with the front face substantially parallel to the support face of the upstanding seat back.

4. The headrest assembly of claim 1 wherein the spring assembly includes a helical compression spring surrounding the rod and extending between one face of the guide and a locking collar fixed to the rod.

5. The headrest assembly of claim 4 further including a second locking collar fixed to the rod on an opposite side of the guide from the locking collar.

6. The headrest assembly of claim 5 wherein at least one of the locking collars provides a lock element that may be released to allow repositioning of the locking collar along the rod.

7. The headrest assembly of claim 1 wherein the guide includes a lock element gripping the inter-fitting rod holding the headrest support in the neutral position.

8. The headrest assembly of claim 1 wherein the base bracket includes a slide element positionable to extend substantially horizontally at a top of the seat back and perpendicular to the support face of the seat back, and a locking clamp attachable to the seat back allowing sliding of the slide element therethrough to adjust the horizontal location of the pivot element.

9. A wheelchair comprising:

a seat assembly having a horizontally extending seat surface adjacent to an upstanding seat back as supported by a seat frame and wheels attached below the seat assembly to the seat frame to support the seat assembly thereabove for rolling movement on the wheels;

a base bracket having a pivot element, the base bracket adapted to attach to the seat assembly to support the pivot element of the base bracket proximate to a back of a seated patient's neck, the pivot element defining a horizontal pivot axis parallel to a support face of the upstanding seat back;

a headrest support with a front face facing a forward direction and adapted to support the seated patient's head wherein the horizontal pivot axis is below the majority of the headrest support to pivot the headrest support with respect to the base bracket, the headrest support further including a headrest cushion attached to the front face; and a spring assembly attached between the base bracket and the headrest support to bias a topmost end of the front face in a forward direction;

wherein the spring assembly includes an interfitting rod and guide, one pivotally attached to the base bracket and one pivotally attached to a distal end of the headrest support opposite the pivot element so that the rod may slide through the guide with pivoting movement of the headrest support.

10. The wheelchair of claim 9 wherein the spring assembly includes a stop element limiting forward travel of the headrest support beyond a neutral position with the front face substantially parallel to the support face of the upstanding seat back.

11. The wheelchair of claim 9 further including a lock locking the headrest support in a neutral position with the front face substantially parallel to the support face of the upstanding seat back.

12. The wheelchair of claim 9 wherein the spring assembly includes a helical compression spring surrounding the rod and extending between one face of the guide and a locking collar fixed to the rod.

13. The wheelchair of claim 12 further including a second locking collar fixed to the rod on an opposite side of the guide from the locking collar.

14. The wheelchair of claim 13 wherein at least one of the locking collars provides a lock element that may be released to allow repositioning of the locking collar along the rod.

15. The wheelchair of claim 9 wherein the guide includes a lock element gripping the inter-fitting rod to hold the headrest support in the neutral position.

16. The wheelchair of claim 9 wherein the base bracket includes a slide element positionable to extend substantially horizontally at a top of the seat back and perpendicular to the support face of the seat back and a locking guide attachable to the seat back allowing sliding of the slide element therethrough to adjust the horizontal location of the pivot element.

* * * * *